United States Patent [19]

Hobrecht

[11] Patent Number: 4,900,058
[45] Date of Patent: Feb. 13, 1990

[54] ROLLGUARD

[76] Inventor: Alvin J. Hobrecht, 6521 Crista Palma Dr., Huntington Beach, Calif. 92647

[21] Appl. No.: 202,370

[22] Filed: Jun. 6, 1988

[51] Int. Cl.⁴ .............................................. B60R 21/13
[52] U.S. Cl. .................................... 280/756; 248/503; 296/102; 403/263; 403/379
[58] Field of Search ................ 280/756; 296/102, 205; 403/260, 263, 378, 379, 376, 240, 243, 289, 347; 248/503, 503.1, 357, 500; 285/188, 189; 256/22, 65

[56] References Cited

U.S. PATENT DOCUMENTS

| | | | |
|---|---|---|---|
| 2,066,227 | 12/1936 | Reukauf, Jr. et al. | 403/379 |
| 2,973,982 | 3/1961 | Elting et al. | 403/379 |
| 3,180,663 | 4/1965 | Lehmann | 403/263 |
| 3,353,852 | 11/1967 | Wood | 296/102 |
| 3,868,190 | 2/1975 | Moore | 296/102 |
| 4,063,836 | 12/1977 | Militano | 403/263 |
| 4,466,600 | 8/1984 | Tuttle | 403/347 |
| 4,701,065 | 10/1987 | Orosa | 403/263 |

FOREIGN PATENT DOCUMENTS 59-32522  2/1984  Japan .................................. 296/102

OTHER PUBLICATIONS

J. C. Whitney Catalog No. 490L, Jan. 88, p. 60.
J. C. Whitney Catalog No. 427B, Oct. 1982, p. 63.

Primary Examiner—Charles A. Marmor
Assistant Examiner—Karin Tyson

[57] ABSTRACT

A vehicle rollguard comprising at least one member of stanchions and struts which are detachably connected. The connections include a necked-down end of one of the interconnecting members and an opening in the other interconnecting member for receiving the necked-down end. The opening in the interconnecting member can be in the sidewall or be an open end. Pairs of opposed aligned apertures in each interconnecting member form a passage for a bolt or other securement means. Securement to a vehicle includes a bracket in the form of a plate having openings for bolting to a vehicle and a pair of upstanding tabs having opposed aligned apertures. Another pair of opposed aligned apertures on the end of the rollguard member to be secured line up with the apertures in the tabs for passage of a bolt or other securement means. A disc of hard plastic overlies the plate and is disposed between the bracket and the end of the rollguard member to be secured.

9 Claims, 4 Drawing Sheets

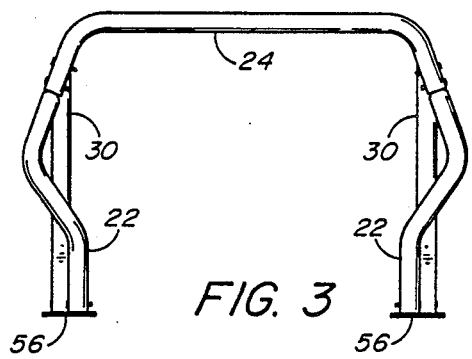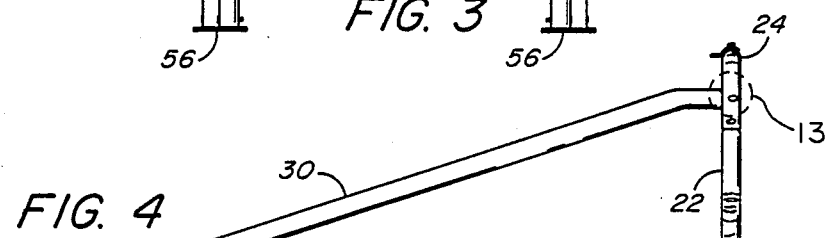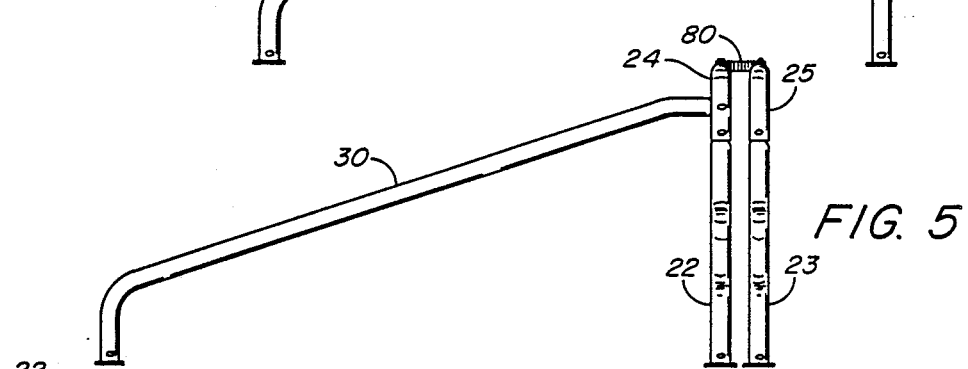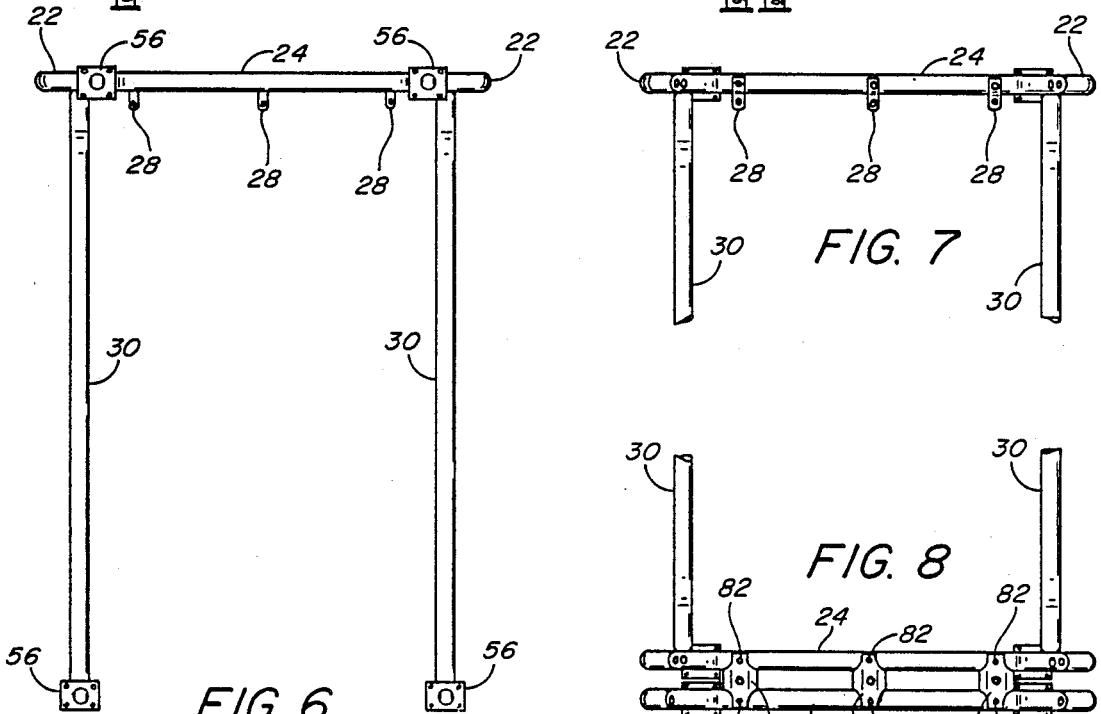

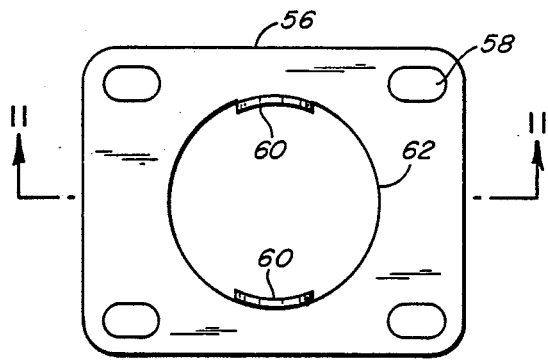
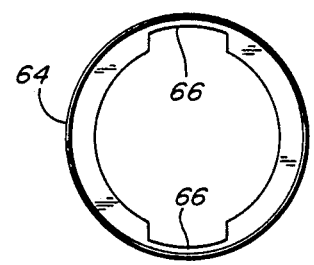
FIG. 9    FIG. 10
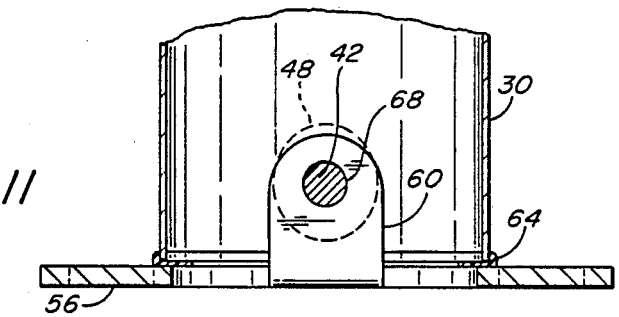
FIG. 11
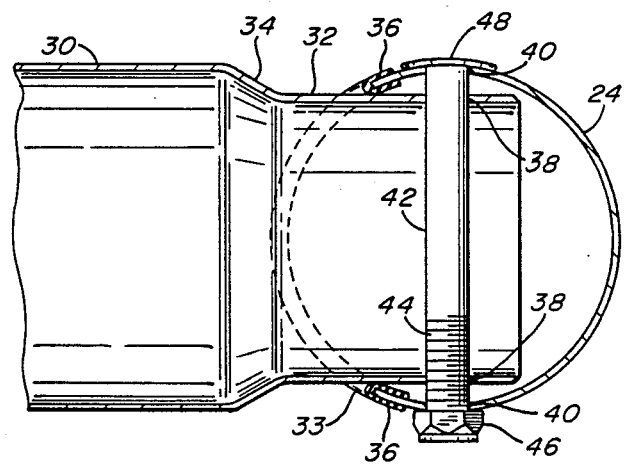
FIG. 12
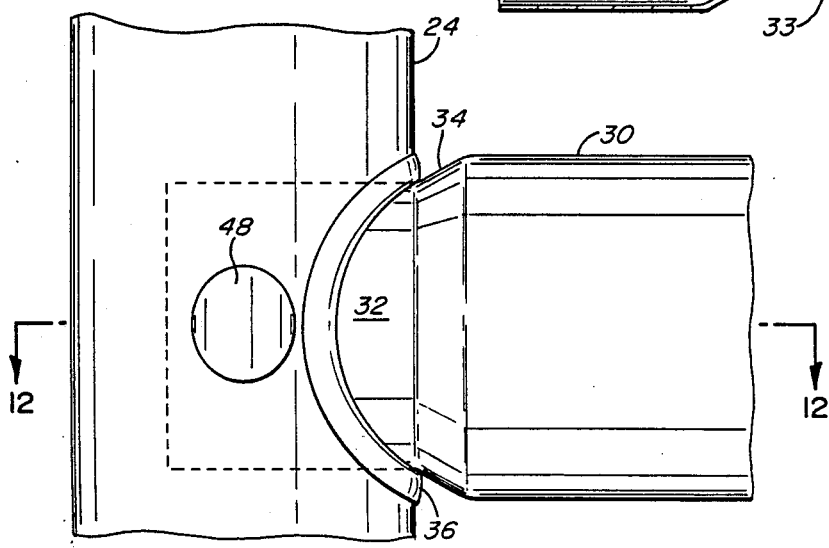
FIG. 13

ROLLGUARD

BACKGROUND OF THE INVENTION

1. Field of the Invention

This invention relates to the field of rollguards, and particularly to rollguards which are used in small to large pickup trucks.

2. Description of the Prior Art

In the past, it has been desirable from a safety standpoint, particularly for four wheel drive vehicles, to protect the vehicle and occupants in the eventuality that the vehicle were to roll over. Such protection has been provided by means of a rollbar or rollguard.

More recently, the rollbar has become popular as a decorative accessory for vehicles which is commonly installed after purchase.

The rollguards are generally comprised of at least one upright member generally formed of a pair of stanchions joined by a cross member, each of the stanchions having an elongated support member, or strut which buttresses the upright member. Each of the stanchions and the struts are generally formed of tubular steel and are normally attached to the floor bed of a truck.

In the past, the assembly of the respective parts has been accomplished by means of welding which produces a rather bulky and extremely heavy product. The weld joints, as well as the points of attachment to the bed of the truck or vehicle frame are subject to rusting. Furthermore, the completed assembled product is difficult to ship due to its large size and weight. Moreover manufacture is costly due to the requirements for welding of the respective parts together.

It is an object of the invention to provide a rollbar or a rollguard which is capable of being detachably connected so that it may be shipped in the form of its separate parts.

It is also an object of the invention to provide a rollbar or guard which is resistant to rusting as compared with prior art rollbars.

It is a further object to provide a rollbar or guard which can be assembled at the point of use with the use of simple tools and without the requirement of welding.

Further objects and advantages of the invention will be apparent to persons familiar with rollbars or guards upon a reading of the following description taken in conjunction with the accompanying drawings.

SUMMARY OF THE INVENTION

A vehicle rollguard comprising at least one member of stanchions and struts which are held together by detachable means. One detachable means includes attachments which are made end to end in which one end is necked down and chamfered to slip-fit into the open end of another member so that it rests on the chamfered surface. A bolt passes through two aligned apertures in each of the respective overlapping ends to secure the two pieces together. A particular feature of the bolt includes a curved head which follows the contour of the exterior surface of the member surrounding the apertures to preclude rotation when tightening on a threaded end of the bolt with a nut.

Another detachable connection means between members includes a necked-down end of one member which is inserted within an opening located within the side wall between the ends of another member. The opening edges in the side wall are provided with a split gasket which closely contacts the surfaces of the necked-down end of the member being joined to it. The joint is secured by means of a bolt as above described which passes through two aligned apertures within each of the necked-down member and the adjoining member and is secured with a nut. The split gasket prevents rusting by preventing moisture from entry within the joint and by cushioning adjoining parts.

The entire assembled structure is joined to the frame of a vehicle by means of brackets which are bolted to the vehicle frame. Each bracket contains a pair of upwardly projecting tabs which are parallel and have aligned apertures for passage of a bolt therethrough.

A plastic disc or ring overlies each bracket and surrounds the projecting tabs. The open end of the strut or stanchion encloses the tabs to rest on the plastic disc. The presence of the plastic disc acts as a barrier between the bracket and the rollguard member to minimize the occurrence of rust.

A pair of aligned apertures spaced from the open end of the strut or stanchion aligns with the apertures in the projecting tabs.

Thus, the vehicle rollguard of the invention utilizing detachable connections instead of welding permits the shipping of the rollguard in its unassembled flattened condition and at the same time permits assembly on site. Furthermore, the design minimizes the occurrence of rust.

DESCRIPTION OF THE DRAWINGS

FIG. 3 shows an elevational end view of the rollguard of FIG. 1.

FIG. 4 shows a side elevation view of the rollguard of FIG. 1.

FIG. 5 shows a side elevation view of another embodiment of the invention.

FIG. 6 shows an upwardly directed view of the rollguard and brackets of the rollguard on which the rollguard rests.

FIG. 7 shows a fragmented portional plan view of the rollguard of FIG. 1.

FIG. 8 shows a fragmented plan view of the embodiment of the invention shown in FIG. 5.

FIG. 9 shows an enlarged plan view of a bracket used to secure the rollguard to the vehicle.

FIG. 10 shows an enlarged plan view of a plastic disc which fits on the bracket shown in FIG. 9.

FIG. 11 shows a cross section taken in the direction of lines 11—11 of FIG. 9.

FIG. 12 shows the joint connecting a strut to a stanchion as shown from a cross section taken along lines 12—12 of FIG. 13.

FIG. 13 shows a side elevation of the joint of FIG. 12 as taken through circle 13 of FIG. 4.

DETAILED DESCRIPTION OF THE INVENTION

Figure 1:
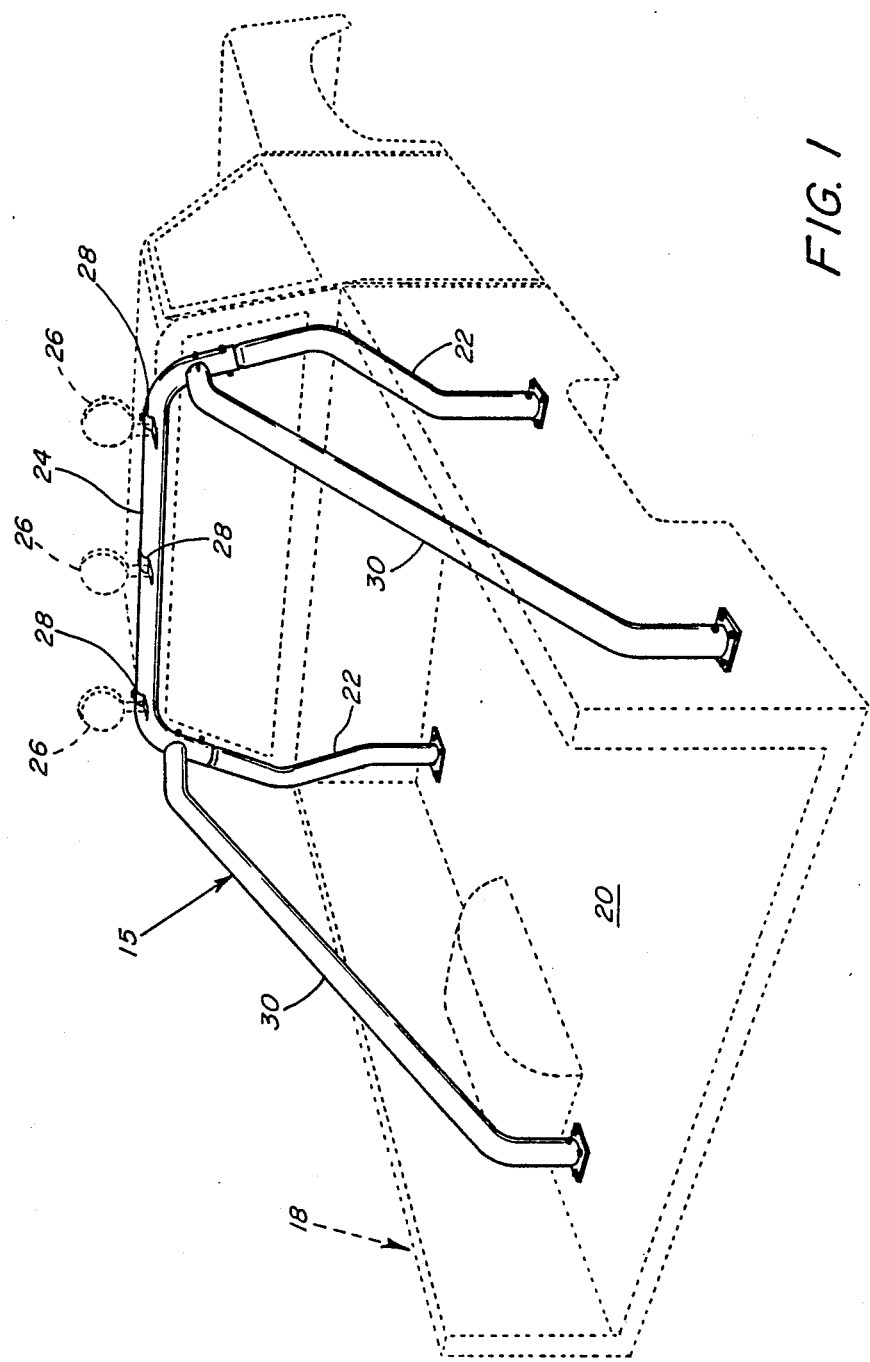
FIG. 1 shows a perspective view of an assembled rollguard according to the invention secured to the bed of a truck.

FIG. 1 shows one embodiment of the rollguard of the invention indicated generally at 15 which is attached to a conventional vehicle shown here in the form of a pickup truck shown in outline and indicated at 18.

As shown, the rollguard or rollbar 15 is attached to the bed 20 of the vehicle 18. As shown, the rollguard 15 is comprised generally of a pair of spaced apart stanchions or uprights 22 joined by a cross bar or bridging member 24. The cross bar 24 contains supports or brackets 28 for purposes of supporting lights or other decorative features as shown in outline at 26 of FIG. 1.

The stanchions 22 and cross bar 24 are braced by struts or rear braces 30. The joint which unites each rear brace 30 to the cross bar 24 is detailed in FIGS. 12 and 13.

As shown, the open end of the rear brace or strut 30 is necked down as indicated at 32 and has a chamfer or sloping shoulder 34. An opening or mouth 33 spaced from the respective end of the cross bar 24 is sized to accommodate the necked-down portion 32 of the strut 30. The exposed edges of the opening 33 of the cross bar 24 are covered with a split rubber gasket 36 which extends from the outside to the inside of the opening or mouth 33.

When the necked-down end 32 of the rear brace 30 is inserted into the opening or mouth 33 of cross bar 24, the necked-down area 32 is effectively sealed by the gasket 36. This acts to prevent the entry of water and therefore preclude the occurrence of rust.

The necked-down area 32 of strut 30 is provided with a pair of aligned apertures 38. A similar pair of aligned apertures 40 in the cross bar 24 line up with the aligned apertures 38 when the necked-down portions 32 is inserted within the opening 33.

A bolt 42 having a threaded end 44 passes through the aligned apertures 40 and 38 and is secured by a nut 46.

The bolt 42 has a specially configured head 48 as shown in FIG. 12 which is formed to conform with the curve of the exterior surface of the cross bar 24. Thus, in one direction across the top of the head 48 the radius of curvature matches the radius of curvature of the exterior surface of the cross bar 34, whereas in the perpendicular direction the surface of the head 48 is aligned with the lengthwise configuration of the tubing. The purpose of the rounded configuration in one direction is to prevent rotation of the bolt 42 when in place and during the tightening down of the nut 46 thereagainst. This results in a very tight or snug fit of the bolt 42 within the apertures 40 and 38 and the corresponding strong and snug fit of the connection between the rear brace or strut 30 and the cross bar 24.

Figure 2:
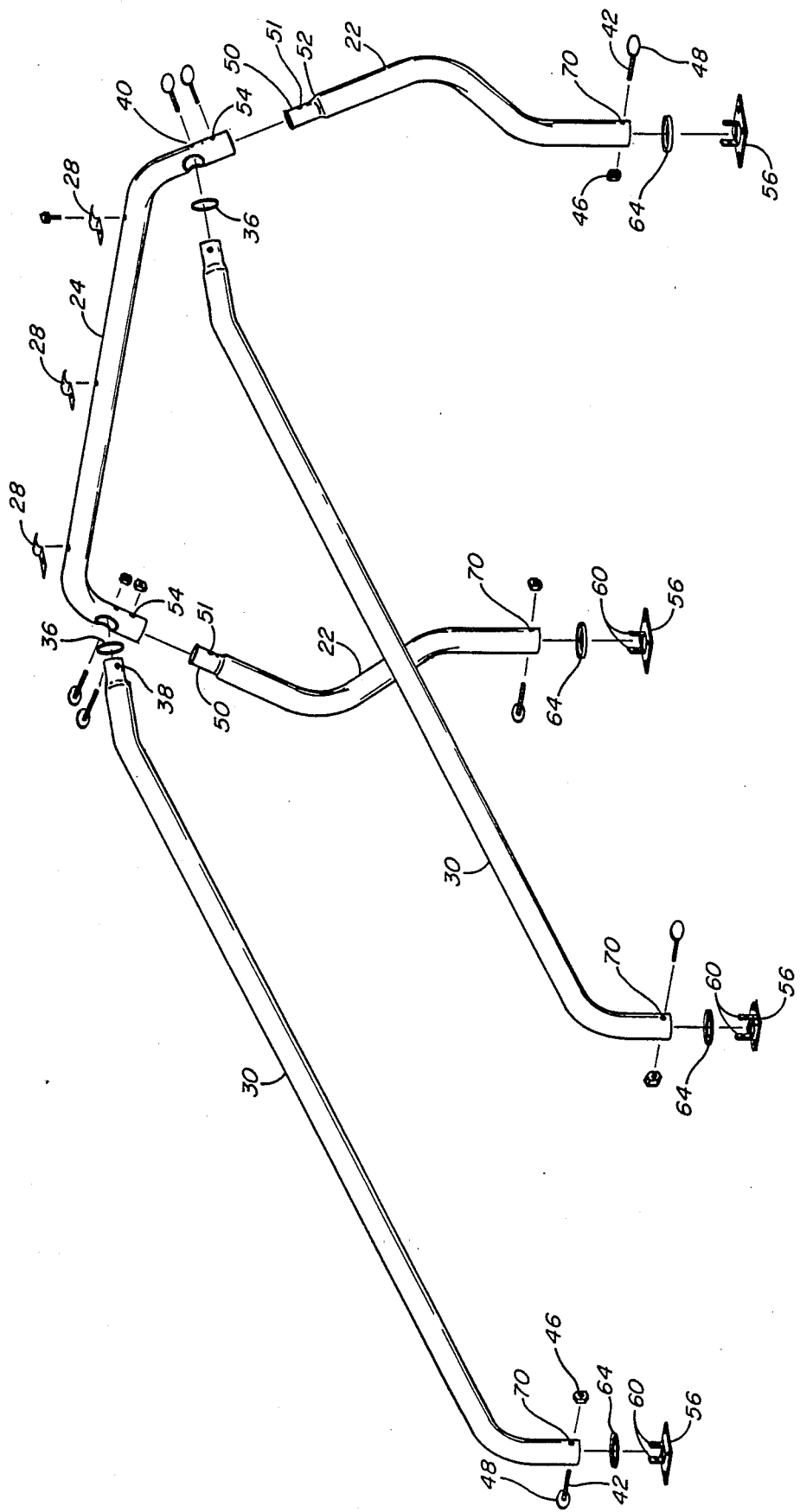
FIG. 2 shows an exploded view of the rollguard of FIG. 1 in its disassembled condition.

As shown in FIG. 2 each of the stanchions 22 are attached to one end of the cross bar 24 by means of a telescoping joint which includes a necked-down area 50 with a shoulder or chamfered area 52 on the end of each stanchion 22. The necked-down area 50 has a pair of aligned apertures 51 which when inserted into the end of cross bar 24 lines up with a pair of aligned apertures 54 on the end of the cross bar. A bolt 42 having a configured head 48 as above described passes through the aligned apertures 54 and 51 respectively and is secured b means of a nut 46. When joined, the open end of the cross bar 24 rests on the chamfered area 52 of the stanchion 22. In this manner, water does not penetrate this joint and rust is therefore resisted.

The assembled rollguard or roll bar 15 is secured to the bed of a vehicle as shown in FIG. 1 and in FIG. 2 in exploded view. The securement means is also detailed in FIGS. 9, 10 and 11.

In FIG. 9 in particular, a bracket 56 is shown in the form of a flat plate having openings 58 for bolting to the vehicle such as the bed or frame of a pickup truck of FIG. 1. An enlarged central opening 62 of the bracket 56 is provided with opposed understanding projections or tabs 60 which as shown in FIG. 11 each contain a central aperture 68 for passage of a bolt 42 therethrough. A flat plastic disc 64 as shown in detail in FIG. 10 is provided with cutout portions 66. The disc 64 slips over the tabs 60 of the bracket 56 and the cutout portions 66 are aligned with the tabs 60. The open ends of the struts 30 as well as the open ends of the stanchions 22 are provided with aligned apertures 70. Each of the ends 22 and 30 respectively is slipped over the tabs 60 of the bracket 56 to rest on the disc 64.

The apertures 70 in each of the struts 30 and the stanchions 22 are aligned with the apertures 68 in tabs 60 of the bracket 56. A bolt 42 having a curved head 48 as above described passes through the aligned apertures 70 and 68 of the respective struts 30 or stanchions 22 and through the apertures 68 of the tabs 60 and are secured by means of a nut 46 on a threaded end 44 of the bolt 42.

The plastic disc ring 64 is preferably made of a hard plastic such as ABS, although other types of plastic materials, for example, nylon, polypropylene, polyester, polysulfone and the like, can be utilized without limiting the invention.

The plastic disc 64 physically separates the contact edge of the respective strut 30 or stanchions 22 from the adjacent bracket 56. Its presence helps prevent the formation of rust by precluding the entry of water and contact between the stanchion 22, or strut and the bracket 56.

Moreover, the above described assembly including the bracket 56 permits the entire rollguard 15 in its assembled condition to be removed from the bed of a vehicle. This may be desirable for various reasons, such as for mechanical repair and painting.

Furthermore, the capability of assembly and disassembly provided by the above described joints, especially as shown in FIGS. 12 and 13 permits the shipping of the respective parts of the rollbar in an unassembled condition and then provides for their assembly on site. This contributes greatly to the reduction in costs for shipping as well as permitting more customized fit to an individual vehicle. Furthermore, in addition to the prevention of rust by use of the rubber seals or gaskets 36 and the plastic discs 64, the capability of disassembly is made especially convenient for installation and removal of such items such as the lights 26 shown in FIG. 1.

The invention has been illustrated primarily with respect to one particular design. However, the invention is not limited to any one particular design. For example, in place of the stanchions 22 of FIG. 4, there can be two pairs of stanchions 22 and 23 as shown in FIG. 5. Each pair of stanchions 22 has a cross bar 24 and each pair of stanchions 23 has a cross bar 25. As shown in FIG. 8 the cross bars 24 and 25 respectively can be united by means of brackets 80 which are secured to the respective cross bars 24 and 25 by means of bolts 82 as shown in FIG. 8.

Other rollguard embodiments not shown can include double pairs of struts as well. Additional cross bars can also be added across the struts. Additionally, the struts, braces and other members such as members 22, 24 and 30 can have a rounded, eliptical, rectangular or other cross section, including the circular one as shown.

Various modifications of the above described invention will be apparent to those skilled in the art and can be resorted to without departing from the spirit and scope of the invention as defined by the following claims.

I claim:

1. A vehicle rollguard comprising:
   one or more members in combination selected from struts, stanchions, and cross members;
   each member having parts for interconnecting said members;
   means for detachably securing one member to another member;
   means for detachably securing said rollguard to a vehicle comprising;
   a plate having a pair of upwardly extending opposed tabs interiorly thereof;
   each tab having an aligned aperture therein;
   the attachable ends of said rollguard members having aligned opposed apertures spaced from the end thereof so that the apertures in said rollguard ends and the aligned apertures in the projecting tabs are aligned when a rollguard end overlies the plate;
   a thin plastic layer disposed between said plate and said ends of the rollguard so that said rollguard ends rest on said plastic layer; and,
   securement means for passing through said aligned apertures.

2. The rollguard as claimed in claim 1 wherein:
   said securement means is a bolt.

3. The rollguard as claimed in claim 1 wherein said bolt comprises:
   a head configured to lie flat against the exterior surface of said end, and having a threaded end for receiving a nut exteriorly of said rollguard end.

4. A vehicle rollguard comprising:
   at least one pair of stanchions united by a cross bar, each stanchion being supported by an interconnecting strut;
   said stanchions being connected to said cross bar by means of a telescoping joint whereby the upper end of each stanchion is necked down for insertion into the end of each cross bar had having opposed aligned apertures within said necked down end and said cross bar ends for passage of a securement means through said aligned apertures;
   said struts being interconnected to one of said stanchions or cross bars by means of a joint comprising an enlarged opening in one of said stanchions or said cross bars;
   the interconnecting end of said strut being necked down for insertion into the enlarged opening of said stanchion or said cross bar;
   a pair of aligned apertures in each of said necked down end and through each of said stanchion or said cross bar whereby said respective aligned apertures are aligned together when said struts and stanchion or cross bar member are interconnected for passage of a securement means through said aligned apertures;
   the free ends of said stanchions and said stuts being provided with aligned opposed apertures spaced from the ends thereof;
   plates having means for securing to a vehicle and having opposed upright extending tabs with aligned apertures therein which align with the aligned openings in the free ends of said struts and said stanchions when said ends overlie said plates; and,
   securement means for passing through said aligned apertures.

5. A rollguard as claimed in claim 4 wherein:
   said securement means is a bolt.

6. A rollguard as claimed in claim 5 wherein said bolt comprises:
   a head configured to lie flat against the exterior surface of said rollguard members, and having a threaded end for receiving a nut exteriorly of said interconnecting ends.

7. A rollguard as claimed in claim 4 wherein:
   said enlarged opening in one of said stanchions or said cross bar has a gasket substantially covering the exposed edges.

8. A rollguard as claimed in claim 4 further comprising:
   a layer of plastic material disposed between said plates and the end of said strut and stanchion so that said ends of said struts and stanchions rest thereon.

9. A rollguard as claimed in claim 6 wherein:
   said enlarged opening in one of said stanchions or said cross bar has a gasket substantially covering the exposed edges; and,
   a layer of plastic material disposed between said plates and the end of each strut and stanchion so that the ends of said struts and stanchions rest thereon.

* * * * *